United States Patent [19]

Tateno

[11] Patent Number: 5,381,728
[45] Date of Patent: Jan. 17, 1995

[54] APPARATUS FOR THE PREPARATION OF SUSHI PRODUCTS

[76] Inventor: Chikara R. Tateno, 1815 Katrina Ct., Santa Cruz, Calif. 95062

[21] Appl. No.: 291,405

[22] Filed: Aug. 16, 1994

[51] Int. Cl.6 ............................................. A23P 1/00
[52] U.S. Cl. ................................. 99/450.1; 99/450.4; 99/485; 425/112; 425/308
[58] Field of Search ............... 99/352, 353, 355, 450.1, 99/450.2, 450.4, 450.5, 450.6, 470.7, 494, 485; 425/371, 112, 113, 297, 308, 315, 327; 118/13, 15, 16; 426/272, 512, 513

[56] References Cited

U.S. PATENT DOCUMENTS

| | | | |
|---|---|---|---|
| 4,439,124 | 3/1984 | Watanabe | 425/112 |
| 4,548,571 | 10/1985 | Suzuki | 425/308 |
| 4,552,523 | 11/1985 | Suzuki | 99/450.1 |
| 4,556,379 | 12/1985 | Ikishima | 425/308 |
| 4,597,731 | 7/1986 | Suzuki | 426/512 |
| 4,637,304 | 1/1987 | Suzuki | 99/450.2 |
| 4,647,467 | 3/1987 | Pinto | 99/450.4 |
| 4,674,967 | 6/1987 | Oseka | 99/450.1 |
| 5,142,956 | 9/1992 | Ueno et al. | 425/308 |
| 5,201,265 | 4/1993 | Matsui | 99/476 |
| 5,225,757 | 11/1993 | Kimura et al. | 99/450.1 |

*Primary Examiner*—Timothy F. Simone
*Attorney, Agent, or Firm*—Jeffrey A. Hall

[57] ABSTRACT

An apparatus for the production of sushi and sushi products comprises a housing member and a first pair of contiguous cylindrical rotatable drums and a second pair of contiguous cylindrical rotatable drums mounted to the housing member and operably engageable with one another. A sheet forming drum is operably engaged to the first and the second pair of contiguous cylindrical rotatable drums and a plurality of rollers is positioned transversely to the sheet forming drum and in operable contact with the sheet forming drum. A plurality of flanges are secured to the housing member and project adjacent to the sheet forming drum allowing for removal and transfer of nori and rice from the sheet forming drum. A first and a second hopper are secured to the housing member for holding and feeding food particles and articles to the drums. The rotation of the drums may be powered and controlled by a motor, or alternatively by a hand-operated crank arm.

10 Claims, 5 Drawing Sheets

APPARATUS FOR THE PREPARATION OF SUSHI PRODUCTS

BACKGROUND OF THE INVENTION

1. Field of the Invention

This invention relates to apparatuses for the production of food products, and particularly to apparatuses for the production of sushi products such as nigiri, maki, and related food products.

2. Description of the Related Art

In the traditional production and preparation of sushi products such as nigiri and maki significant amounts of time and effort are required for the hand production of such products. Although some prior attempts have been made to mechanically produce such products none has, to applicants knowledge, been able to produce a high quality product at a high rate of production or uniformity of product. Such limitations have undoubtedly been a reason such prior apparatuses have not achieved widespread acceptance.

Sushi products such as nigiri and maki are extremely popular in the United States, Japan, and other countries. Nigiri are small ball shaped forms of vinegared boiled rice which, once produced, are topped with sliced fish or shellfish, omelet, or other traditional toppings. The present invention allows for the manufacture of nigiri rice balls at a high rate of production and uniformity. The present invention may be adapted for restaurant or home use, and provides a means to produce a uniform product at a controlled rate predetermined by the operator of the apparatus.

Another sushi product to which the present invention is particularly suited to produce is maki. Maki are thin sheets of seaweed, which will be referred hereinafter to as nori. The nori is topped with a layer of vinegared boiled rice, which once produced, is filled with pieces of fish, omelet, vegetables or other traditional food articles. The nori, rice, and filling are then traditionally rolled by hand into a cylindrical tube and then pressed by hand with a bamboo mat so as to tighten and consolidate the nori, rice, and fillings. The maki is then sliced into pieces and served.

Accordingly it is a primary object of the present invention to provide a means for the efficient, uniform production of nigiri, maki, and other sushi products. The present invention provides a means to apply a layer of rice to sheets of nori at a high rate of speed and uniformity, resulting in a uniform and superior product. Moreover, the apparatus of the present invention allows for the production of any quantity of nori sheets with rice for maki, controlled and predetermined by the operator of the apparatus. In another mode of operation the present invention allows for the rapid and efficient production of nigiri rice balls and/or nori sheets with rice for maki, either together or separately, the production of which can be determined and controlled by the operator of the apparatus.

Additional objects and advantages of tile invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve tile foregoing objects, and in accordance with the purposes of the invention as embodied and broadly described herein, an apparatus for the preparation of sushi products is provided, comprising: a housing member; a first pair of contiguous cylindrical rotatable drums adapted to turn and form sushi products between interfacing surfaces of said drums; said first pair of contiguous rotatable drums being operably mounted to said housing; said first pair of contiguous rotatable drums comprising a forming drum and a transfer drum; said forming drum including a plurality of wells on the surface thereof, each of said wells including a plurality of teeth on an upper perimeter wall thereof; each of said wells including a floor plate secured to a piston element operably extending through an aperture in the well; a second plate is angularly mounted at an opposing end of said piston element; said second plate including a plurality of bearings mounted to a lower surface thereof; a spring is operably secured to said first plate and to a mounting plate on said piston element; said transfer drum having a plurality of spaced blades operably mounted on the surface thereof; trigger means for controlled engagement of said piston element with said second plate for operable control of said piston element; a second pair of contiguous cylindrical rotatable drums operably engaged to said first pair of contiguous cylindrical drums; said second pair of drums including a forming drum having a plurality of wells having a plurality of teeth on an upper perimeter wall thereof adapted to mate with said plurality of teeth on said upper perimeter wall of said forming drum of said first pair of drums, and a transfer drum including a plurality of spaced blades operably mounted on the surface thereof; a sheet forming drum operably engaged to said first and said second pair of contiguous cylindrical rotatable drums; said sheet forming drum including a plurality of teeth spaced on the surface thereof and adapted to hold and transfer individual nori sheets thereon; a plurality of rollers positioned transversely to said sheet forming drum and in operable contact with said sheet forming drum; a plurality of flanges projecting adjacent to said sheet forming drum and operably secured to said housing, allowing for removal and transfer of nori and rice from said sheet forming drum; a first hopper operably positioned in said housing member and in proximity to said first and said second pair of contiguous cylindrical rotatable drums; said first hopper including a receiving opening for receiving food particles, said receiving opening including a cover operably mounted thereon; the first hopper further including a dispensing aperture for dispensing food particles to said first and said second pair of contiguous cylindrical rotatable drums; a second hopper operably positioned in said housing member and in proximity to said sheet forming drum; said second hopper including a receiving opening for receiving food articles and a dispensing opening for dispensing food articles to said sheet forming drum; said second hopper including a toothed appendage proximate to said dispensing opening for positioning and dispensing individual food articles against said sheet forming drum; and means for controlling the rotation of said first and said second pair of contiguous rotatable drums and for controlling the rotation of said sheet forming drum.

The means for controlling the rotation of said first and said second pair of contiguous rotatable drums and for controlling the rotation of said sheet forming drum preferably comprises an electric motor means, however, in alternative embodiments a hand operated crank or other mechanical rotating means may be provided.

The apparatus of the present invention may be provided sized for use in commercial production, restaurants, or home use. The housing member may be provided in a wide variety of shapes and configurations depending upon the application, and composed of durable resilient materials, such as plastic, metal, composites, wood, or the like.

BRIEF DESCRIPTION OF THE DRAWINGS

The accompanying drawings, which are incorporated m and constitute a part of the specification, illustrate a preferred embodiment of the invention and, together with a general description given above and the detailed description given below, serve to explain the principles of the invention.

DETAILED DESCRIPTION OF THE PREFERRED EMBODIMENTS OF THE INVENTION

Figure 1:
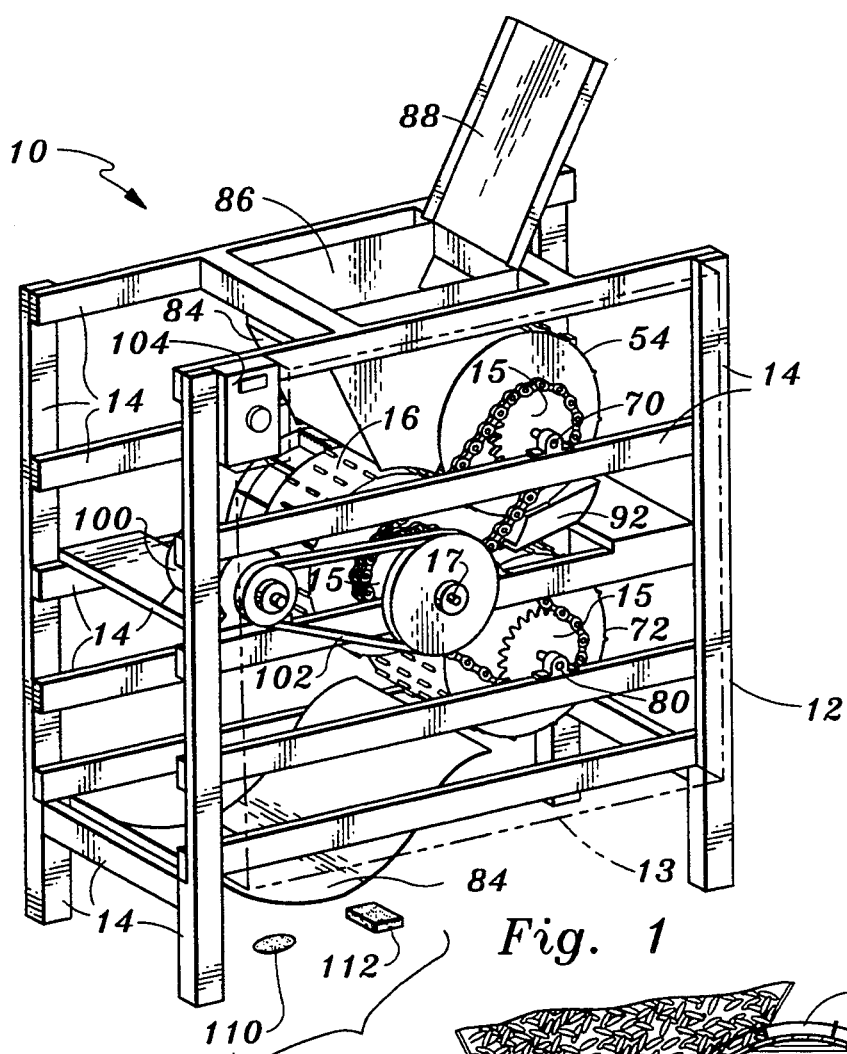
FIG. 1 is a front perspective view of an embodiment of an apparatus for the preparation of sushi products incorporating the teachings of the present invention.

Reference will now be made in detail to the present preferred embodiments of the invention as illustrated in the accompanying drawings.

In accordance with the present invention, there is provided an apparatus for the preparation of sushi products, comprising: a housing member; a first pair of contiguous cylindrical rotatable drums adapted to turn and form sushi products between interfacing surfaces of said drums; said pair of contiguous rotatable drums being operably mounted to said housing member; said first pair of contiguous rotatable drums comprising a forming drum and a transfer drum; said forming drum including a plurality of wells on the surface thereof; each of said wells including a floor plate secured to a piston element operably extending through an aperture in the well; a second plate is angularly mounted at an opposing end of said piston element; said second plate including a plurality of bearings mounted to a lower surface thereof; a spring is operably secured to said floor plate and to a mounting plate on said piston element; said transfer drum having a plurality of spaced blades operably mounted on the surface thereof; trigger means for controlled engagement of said piston element with said second plate for operable control of said piston element; a second pair of contiguous cylindrical rotatable drums operably engaged to said first pair of contiguous cylindrical drams; said second pair of drams including a forming drum having a plurality of wells on the surface thereof for receiving and forming rice therein; each of said plurality of wells having a plurality of teeth on said upper perimeter wall of said forming drum of said first pair of drums; and a transfer drum including a plurality of spaced blades operably mounted on the surface thereof; a sheet forming drum operably engaged to said first and said second pair of contiguous cylindrical rotatable drums; said sheet forming drum including a plurality of teeth spaced on the surface thereof and adapted to hold and transfer individual nori sheets thereon; a plurality of rollers positioned transversely to said sheet forming drum and in operable contact with said sheet forming drum; a plurality of flanges projecting adjacent to said sheet forming drum and operably secured to said housing member, allowing for removal and transfer of nori and rice from said sheet forming drum; a first hopper operably positioned in said housing member and in proximity to said first and said second pair of contiguous cylindrical rotatable drums; said first hopper including a receiving opening for receiving food particles, said receiving opening including a cover operably mounted thereon; the first hopper further including a dispensing aperture for dispensing food particles to said first and said second pair of contiguous cylindrical rotatable drums; a second hopper operably positioned in said housing member and in proximity to said sheet forming drum; said second hopper including a receiving opening for receiving food articles and a dispensing opening for dispensing food articles to said sheet forming drum; said second hopper including a toothed appendage proximate to said dispensing opening for positioning and dispensing individual food article against said sheet forming drum; and means for controlling the rotation of said first and said second pair of contiguous rotatable drums and for controlling the rotation of said sheet forming drum.

In FIG. 1, an apparatus for the preparation of sushi products 10 such as nigiri 110 or maki 112, is shown according to a preferred embodiment of the invention. Apparatus 10 preferably includes a housing member 12 with vertical and horizontal supports 14 and safety cover 13. Housing member 12 may be composed of any durable resilient material such as plastic, metal, wood, composite, or the like, and sized according to its application, for example larger sizes can be provided for commercial or restaurant applications, while home applications would use a smaller housing size.

Figure 3:
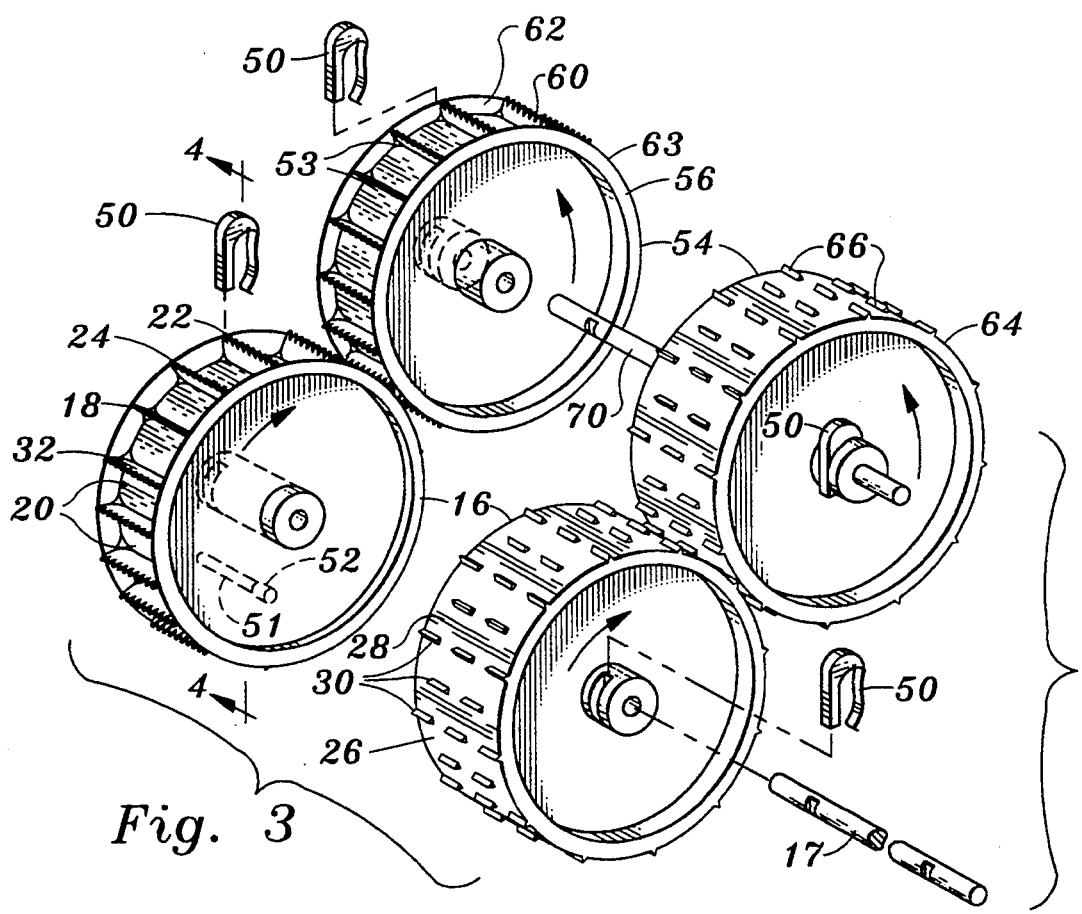
FIG. 3 is an exploded view of a first and a second pair of contiguous cylindrical rotatable drums of such apparatus, according to the invention.

As seen in FIGS. 1 and 3, a first pair of contiguous cylindrical rotatable drums 16 are adapted to turn on axle 17 and may be further secured thereon by a clip 50, ring block, or clamp for detachable securing the pair of drums 16 together. Drums 16 are preferably rotatably mounted on axle 17 operably secured to motor 100 by drive means 102 which may comprise a shaft, belt, and other conventional drive means well known in the art, and drive train 15 operably linked to control panel 104. Alternatively, axle 17 may be rotated by a hand crank 106 or other manual means. The first pair of contiguous drums 16 preferably comprise a forming drum 18 and a transfer drum 26.

Figure 2:
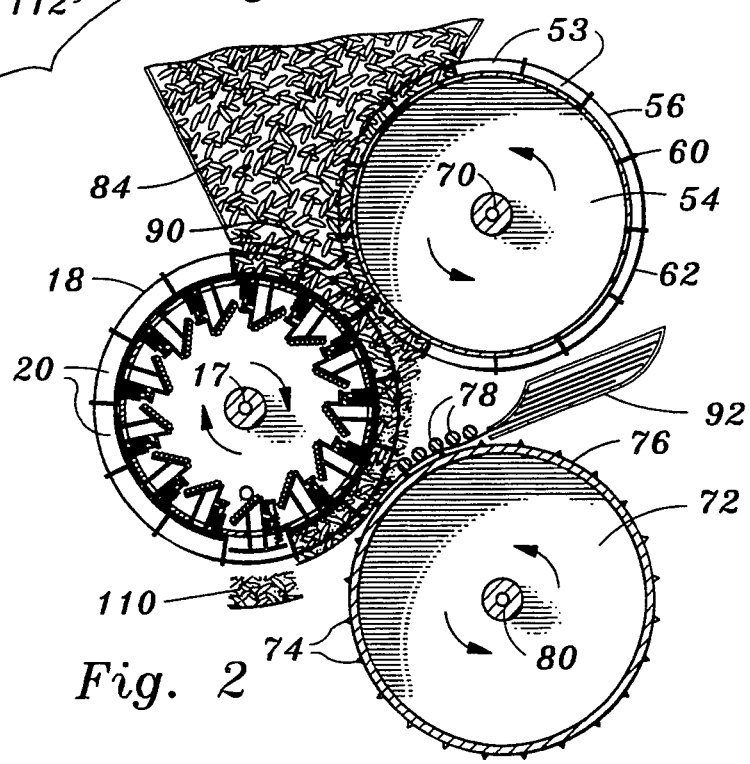
FIG. 2 is a sectional view through 4—4 of such an apparatus for the preparation of sushi products, according to the invention.
Figure 4:
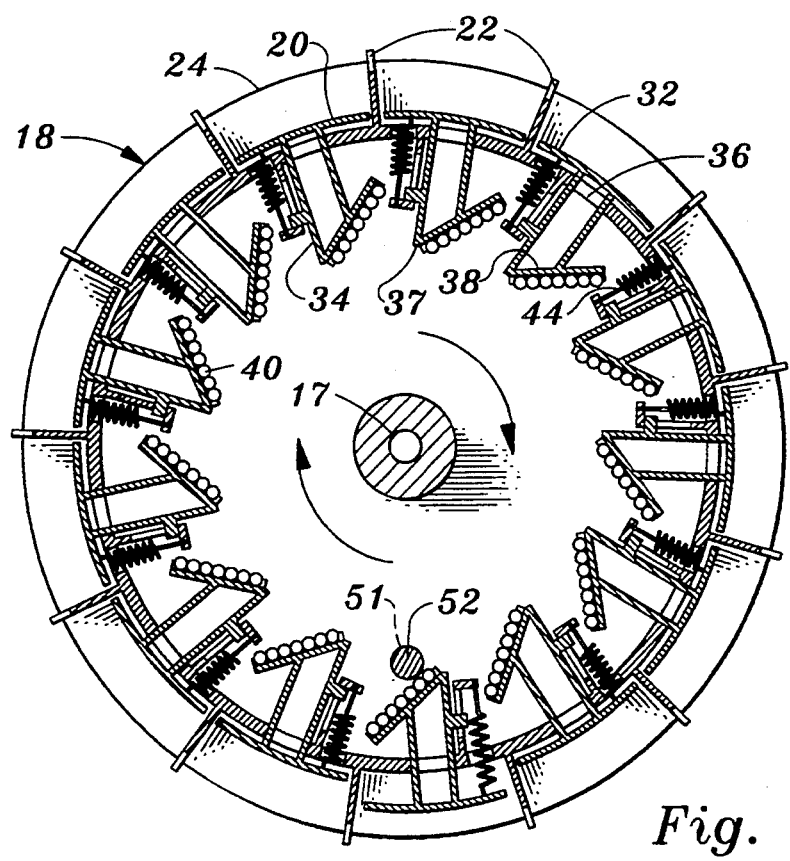
FIG. 4 is a sectional view through 4—4 of a forming drum of the first pair of contiguous cylindrical rotatable drums of such apparatus, according to the invention.
Figure 5:
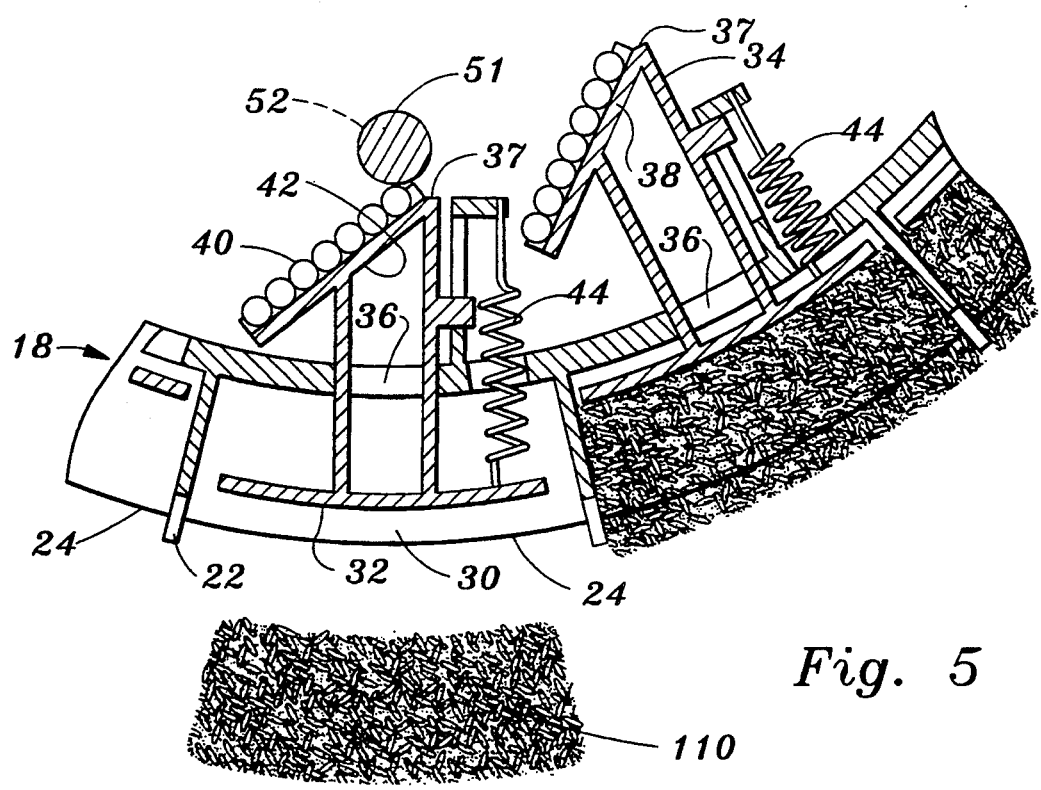
FIG. 5 is an exploded view a well, plate, and piston element of such apparatus, according to the invention.

Referring now to FIGS. 2, 4, and 5, forming drum 18 preferably includes a plurality of wells 20 spaced on the surface thereof, each of wells 20 includes a plurality of teeth 22 positioned on an upper perimeter wall 24. Wells 20 each have a floor plate 32 operably secured to a piston element 34 which extends through an aperture 36 in the bottom of well 20. A second plate 38 is preferably angularly mounted at an opposing end 37 of piston element 34. Second plate 38 has a plurality of bearings 40 mounted to a lower surface 42. Bearings 40 may be mounted to plate 38 by mounting in a trough or channel or by other mechanical means well known in the art. A spring 44 is secured to floor plate 32 and to a mounting plate 38 secured to piston 34 by screws, bolts, rivets, or other mechanical fastening means. Transfer drum 26 is preferably linked to drum 18 so as to be controllably separable from or rotatable with drum 18 on axle 17, and may be so linked with clip 50, or ring, block, or other fastening means. Transfer drum 26 is preferably provided with a plurality of spaced blades 30 on surface 28.

Referring now to FIG. 4, trigger means for the controlled engagement of piston element 34 is preferably provided by post 52 which may be secured to drum 18 or housing 12 so as to engage second plate 38 as drum 18 is rotated about axle 17. When plate 38 engages post 52, plate 38 rides on bearings 40 pushing down piston element 34 thereby pushing floor plate 32 up through well 20 and ejecting the nigiri or rice ball, or other food article, out of well 20 to a container or other food holding article.

A second pair of contiguous cylindrical rotatable drums 54 are operably positioned in proximity to and engageable with first pair of drums 16. The second pair of contiguous cylindrical rotatable drams 54 includes a forming drum 56 for forming nigiri or rice balls rotatable on axle 70. Forming drum 56 includes a plurality of spaced wells 53 on the surface thereof for receiving, securing, and forming rice therein. Each of wells 53 have a plurality of teeth 60 on all upper perimeter wall 62 thereof adapted to mate with the teeth 22 on the upper perimeter walls of forming drum 18 of tile first pair of drums 16. A transfer drum 64 is detachably secured to forming drum 56 and includes a plurality of spaced blades 66 operably mounted on the surface thereof. Transfer drum 64 and forming drum 56 may be rotated together on axle 70 or may be separated and rotated separately depending upon the application.

Figure 8:
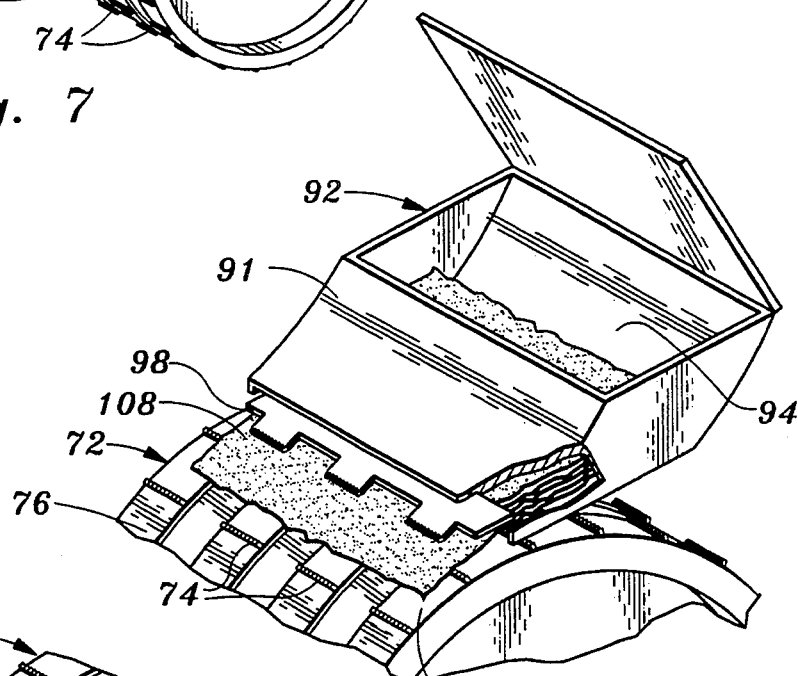
FIG. 8 shows a perspective view of the second hopper and sheet forming drum of such apparatus, according to the invention.

As seen in FIGS. 1, 2, and 8, a sheet forming drum 72 is shown operably engaged to axle 80 and proximately positioned to the first pair of contiguous cylindrical rotatable drums 16 and the second pair of contiguous cylindrical rotatable drums 54 and provides a means to transfer, shape and prepare maki by drawing individual sheets of nori on surface 76 having a plurality of spaced teeth 74 positioned thereon.

Figure 9:
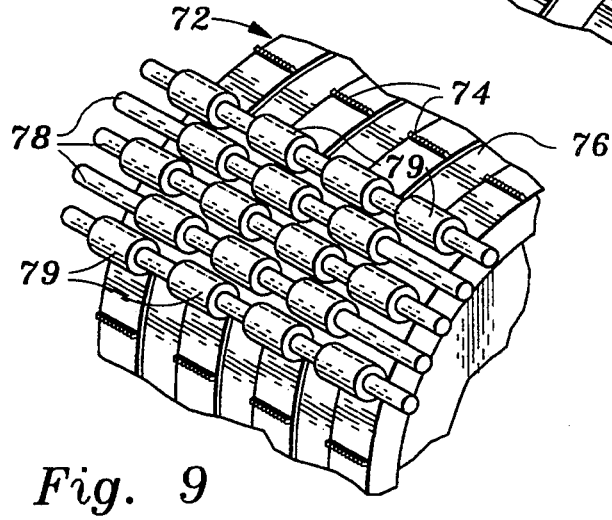
FIG. 9 shows an exploded view of rubber rollers for maki production of such apparatus, according to the invention.

Referring now to FIG. 9, a plurality of rollers 78 are preferably positioned transversely to sheet forming drum 72 and are in operable contact with drum 72. Rollers 78 are preferably covered with a layer of rubber 79. Rollers 78 are positioned so that teeth 74 on drum 72 pass beneath the rollers without harming or wearing the rollers. Rollers 78 serve to hold and position individual nori sheets on surface 76 of drum 72. Rollers 78 may be secured to housing member 12 by fastening the rollers into apertures in housing member 12, or by screws, bolts, clamps, or other mechanical fastening means well known in the art. Rollers 78 may be composed of any durable, resilient material such as plastic, rubber, metal, or the like.

Figure 10:
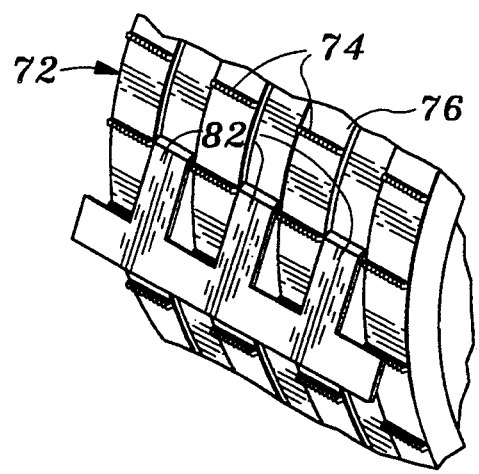
FIG. 10 shows a perspective view of the sheet forming drum with flanges 82 in operable proximity thereto of such apparatus, according to the invention.

In FIG. 10, a plurality of flanges 82 are shown projecting adjacent to sheet forming drum 72 and operably secured to housing member 12 by screws, weld, bolts, or other well known mechanical fastening means, or may be fastened to housing member 12 by securing the flanges to a support element and then fastening the support element to housing member 12. Flanges 82 are positioned so as to make controlled contact with drum 72 preferably at a point below the convergence point of drums 16 and 54, best seen in FIGS. 1 and 10. As rice and nori make contact at the convergence point of drums 16, 54, and 72 they am projected towards flanges 82 by the drums rotation. Flanges 82 simultaneously lift the rice and nori off of dram 72 for maki production, and guide the maki to exit the machine.

In FIG. 1 a first hopper 84 is shown for feeding rice and other food particles to drums 16 and 54. Hopper 84 may be composed of any durable resilient material such as plastic, rubber, metal, or the like, and includes a top opening 86, a cover 88 and a dispensing opening 90. Hopper 84 is preferable configured with downwardly slanted walls so that when rice or other food articles are placed in opening 86, the food articles slide to dispensing opening 90 for, dispensing onto drums 16 and 54. A dispensing cover for the dispensing opening 90 may alternatively be provided so that when rice or other food articles are placed in hopper 84 their release onto drums 16 and 54 may be controlled.

A second hopper 92, best seen in FIGS. 2 and 8, is operably positioned in proximity to the sheet forming drum 72 by attachment to housing member 12 by screws, bolts, welds, or the like. Second hopper 92 is preferably used for the production of maki and is provided with slanting walls 91 and receiving opening 94 for placing nori sheets or other food articles into hopper 92. Receiving opening 92 may be provided with a cover or alternatively be left open. A dispensing opening 96 on hopper 92 is preferably positioned adjacent to and above sheet forming drum 72. A toothed element or appendage 98, preferably composed of rubber, is secured to dispensing opening 96. Preferably appendage 98 is in operably contact with the surface of sheet forming drum 72 and is perforated on one edge thereof to allow teeth projecting from surface 76 of sheet forming drum 72 to pass through without harming the rubber. The tension provided by appendage 98 holds individual nori sheets passing from second hopper 92 firmly against surface 76 of sheet forming drum 72. The rotation of drum 72 draws the sheet of nori under rollers 78. As the nori sheet exits from beneath rollers 78 contact is made with sushi rice from drums 16 and 54, and the finished sushi product is ejected from apparatus 10 by the rotation of the drums.

Figure 11:
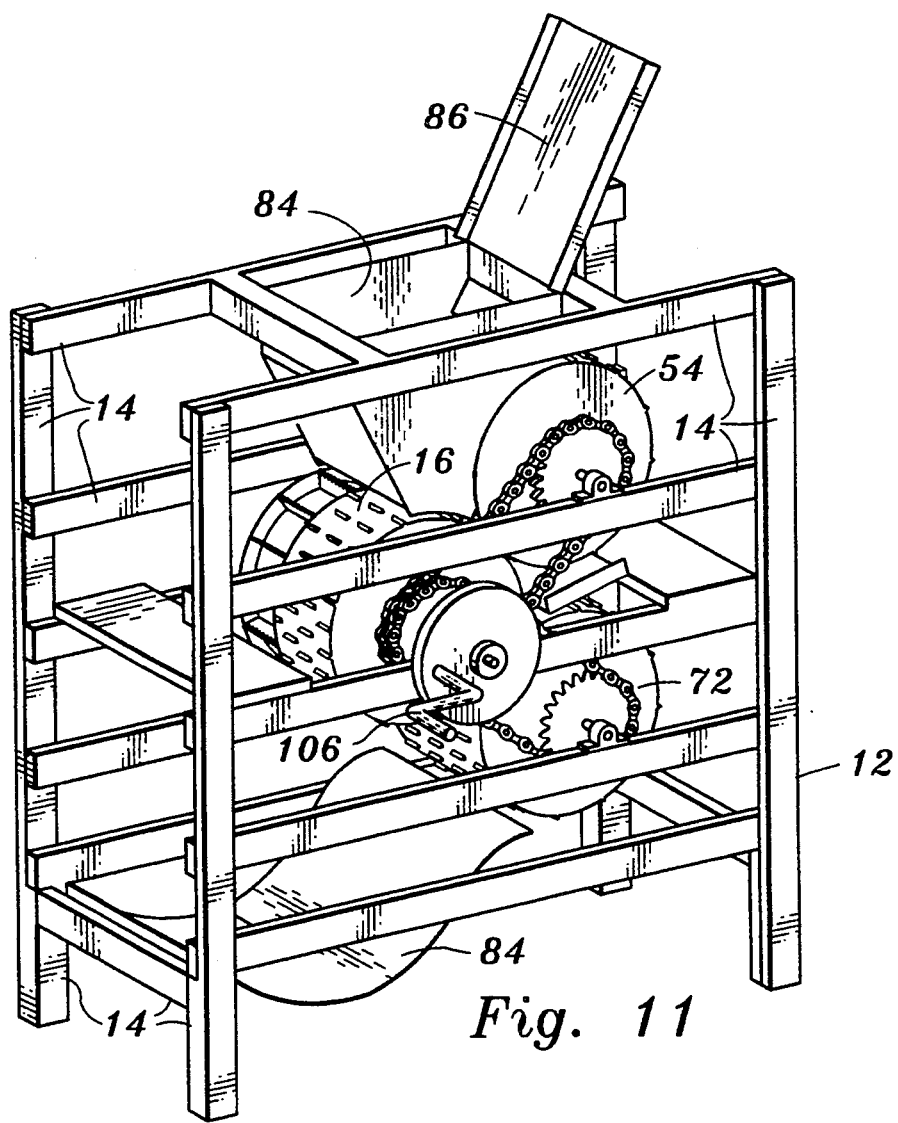
FIG. 11 shows a perspective view of such apparatus with a hand operated crank 106, according to another embodiment of the invention.

Means for controlling the rotation of drums 16, 54 and 72 is preferably provided by an electric motor 100 operably mounted onto housing member 12 with drive means controllably linked to axles 17, 70, and 80. Drive means 102 preferably comprises, a drive shaft, cam, and ring gear operably linked to axles 17, 70 and 80, and powered by motor 100, as well known in the art. A control panel 104 is mounted to housing member 12 and operably linked to motor 100 allowing control of the rotation and direction of drums 18, 26, 56, 64, and 72. Alternatively, motor 100 may be replaced by a hand crank 106, as seen in FIG. 11, for rotating drums 26, 56, 64, and 72. Of courses, various types of motors and hand operated cranks may be provided depending upon the particular application or design of apparatus 10.

Referring now to FIG. 3 it is seen that first pair of contiguous drums 16 comprising forming dram 18 and transfer drum 26, are rotatable about axle 17 either together as a unit if held together by clip 50, or are separately rotatable and operable if separated. Similarly, the second pair of drums 54, comprising forming drum 56 and transfer drum 64 are separately rotatable and operable from one another on axle 70 if clip 50 is disconnected. Of course, apparatus 10 may be provided with means to automatically or electronically control the rotation of the individual drums on the axles, or clip 50, or other mechanical fastening means may be connected or disconnected manually.

Figure 6:
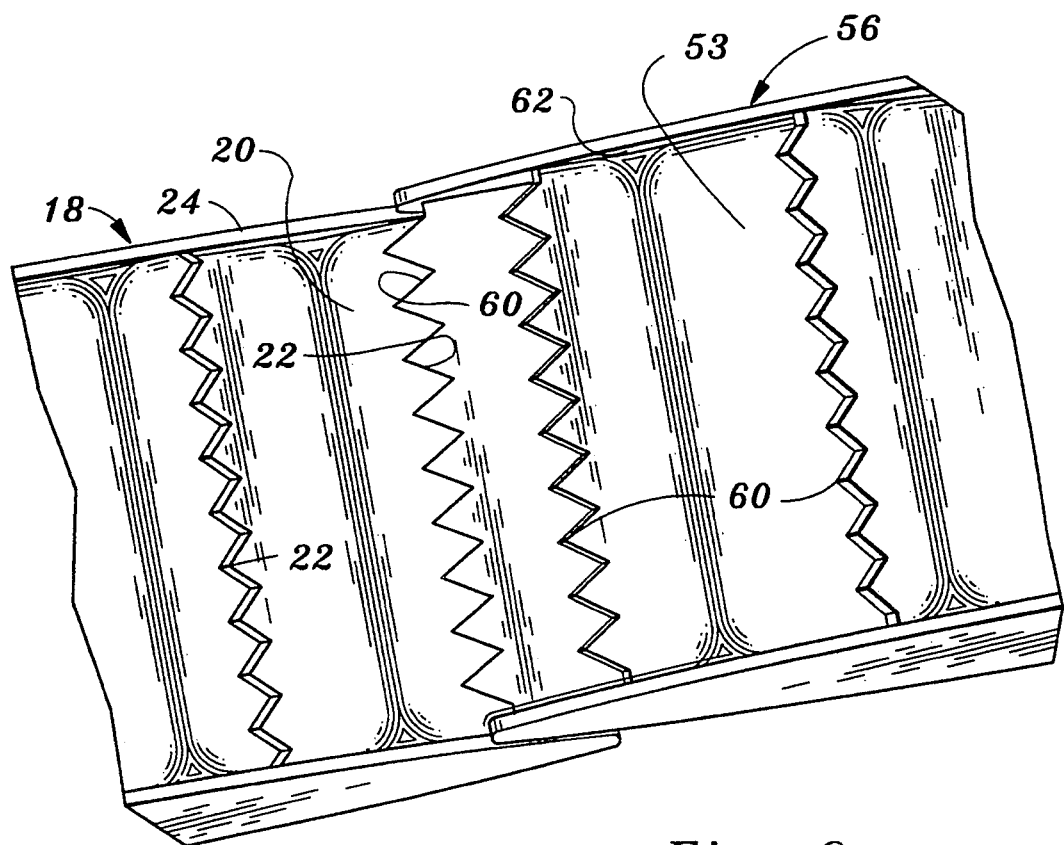
FIG. 6 shows an exploded view of the rice forming wells of the forming drums and nigiri ball, according to the invention.

Referring now to FIGS. 3 and 6, wells 20 on first pair of drums 16 are preferably provided having a greater depth than wells 53 on second pair of drums 54. Of course, in alternative embodiments this arrangement can be reversed, however, as seen in FIG. 6, by forming the two parts of the nigiri or rice balls in different sizes by having wells 20 of a deeper depth than wells 53 this prevents both the premature ejection of the rice balls and allows for the production of a superior shaped and dimensioned rice ball.

Figure 7:
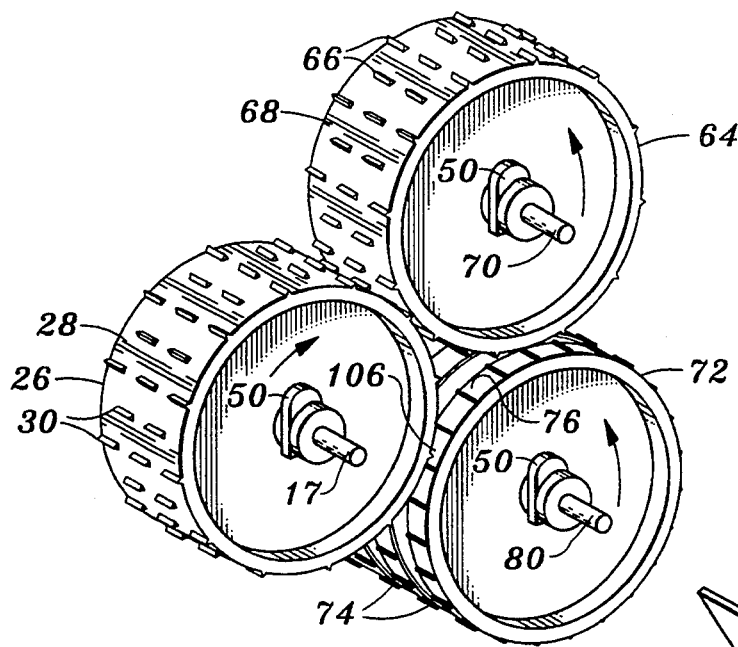
FIG. 7 shows an exploded view of the transfer drum of the first pair of contiguous cylindrical rotatable drums and the transfer drum of the second pair of contiguous cylindrical rotatable drums of such apparatus, according to the invention.

In FIG. 7, transfer drums 26 and 64 are shown in a preferred alignment with surface 28 with blades 30 in operable alignment and positioning to surface 68 and blades 66 of drum 64. The arrows in FIG. 7 indicate the preferred rotation of drums 26 and 64 respectively in relation to one another. Rice or other food articles on surface 28 and 68 are kept from adhering or sticking together by blades 30 and 66 and propelled to the confluence point of drum 26 and drum 72 designated as point 106.

In reference to FIGS. 2 and 4, trigger element 52 for control of piston element 34 preferably includes a post 51 secured to housing member 12. As drum 18 rotates past trigger element 52 plate 38 with bearings 40 is depressed causing piston element 34 to move downward or out of well 20 ejecting tile rice ball or other food article held therein. Alternatively, post 51 may be replaced by other trigger means, such as a knob, flange, or the like, so long as the trigger means provides a mechanism for moving piston element 34 in a downward or outward fashion due to the rotation of drum 18 about axle 17. Trigger element 52 is preferably composed of a durable water and heat resistant material, such as plastic, rubber, metal or the like.

In operation and use, apparatus 10 for the preparation of sushi products, provides a very reliable and efficient means for preparing sushi products, in particular nigiri and maki. In either commercial applications such as restaurants, or in private use such as in homes, apparatus 10 allows both the skilled cook or novice to produce a very high quality sushi product in small amounts or in large quantities. To use and operate apparatus 10, the user loads hopper 84 with rice, preferably vinegared, boiled sushi rice. By activating motor 100 by means of control panel 104, drums 16 and 54 automatically form and dispense nigiri or rice balls as the rice from hopper 84 is dispensed to drums 16 and 54 as seen in FIG. 2. As seen in FIG. 2, the rice is transferred from hopper 84 to wells 20 on drum 18 and wells 53 on drum 56. The rotation of the drum 18 past trigger element 52 effects the ejection of the formed nigiri balls from the wells. In this manner, by controlling the speed of rotation and the amount of rice fed into hopper 84 any amount of nigiri or rice balls can be made.

In the production of maki, sheets of seaweed are placed in hopper 92 and rice placed in hopper 84. As sheet forming drum 72 is rotated by motor 100, individual sheets of seaweed or nori are dispensed from hopper 92. Curved walls 91 of hopper 92 ensure that individual nori sheets approach opening 96 with toothed appendage 98 where contact occurs with the protruding teeth 74 on drum 72. Teeth 74 draw the sheet of nori forward onto drum 72 under rollers 78 which cause the sheet of nori to conform to the surface of drum 72. The nori sheet is drawn to the convergence space of drums 16, 54 and 72, designated point 106. The nori sheets enter point 106 at the same time as rice that has been propelled there by the opposingly rotating drums 16 and 54. By controlling the distance which separates drums 16 and 54 different thicknesses of rice are propelled to point 106 where the rice makes contact with the nori sheets. As sushi rice is naturally sticky adhesion occurs when the rice comes in contact with the nori from drum 72. As the rice and nori are drawn forward by the rotation of drums 16 and 72, flanges 82 lift the rice and nori off of drum 72 by the rotation of drum 72 against flanges 82, thereby ejecting the rice and nori from the drum to a container or other holding apparatus.

The overall size and dimensions of apparatus 10 may be tailored to the specific application. For example, typically a smaller size housing and drums would be provided for home or individual use, while a larger size would be provided for restaurants and other commercial uses. Similarly, the style and design of housing member 12 may be altered for different applications, and various materials may be used to compose the individual parts and housing without departing from applicants inventive concept.

Additional advantages and modifications will readily occur to those skilled in the art. The invention in its broader aspects is, therefore, not limited to the specific details. representative apparatus and illustrative examples shown and described. Accordingly, departures may be made from such details without departing from the spirit or scope of the applicant's general inventive concept.

What is claimed is:

1. An apparatus for the preparation of sushi products, comprising:

a housing member;

first pair of contiguous cylindrical rotatable drums adapted to turn and form sushi products between interfacing surfaces of said drums; said first pair of contiguous rotatable drums being operably mounted to said housing; said first pair of contiguous rotatable drums comprising a forming drum and a transfer drum; said forming drum including a plurality of wells on the surface thereof, each of said wells including a plurality of teeth on an upper perimeter wall thereof; each of said wells including a floor plate secured to a piston element operably extending through an aperture in the well; a second plate is angularly mounted at an opposing end of said piston element; said second plate including a plurality of bearings mounted to a lower surface thereof; a spring is operably secured to said floor plate and to a mounting plate on said piston element; said transfer drum having a plurality of spaced blades operably mounted on the surface thereof;

trigger means for controlled engagement of said piston element with said second plate for operable control of said piston element;

a second pair of contiguous cylindrical rotatable drums operably engaged to said first pair of contiguous cylindrical drums; said second pair of drums including a forming drum having a plurality of wells on the surface thereof for receiving and securing rice therein; each of said plurality of wells having a plurality of teeth on an upper perimeter wall thereof adapted to mate with said plurality of teeth on said upper perimeter wall of said forming drum of said first pair of drums; and a transfer drum including a plurality of spaced blades operably mounted on the surface thereof;

a sheet forming drum operably engaged to said first and said second pair of contiguous cylindrical rotatable drums; said sheet forming drum including a plurality of teeth spaced on the surface thereof and adapted to hold and transfer individual nori sheets thereon;

a plurality of rollers positioned transversely to said sheet forming drum and in operable contact with said sheet forming drum;

a plurality of flanges projecting adjacent to said sheet forming drum and operably secured to said housing member, allowing for removal and transfer of nori and rice from said sheet forming drum;

a first hopper operably positioned in said housing member and in proximity to said first and said second pair of contiguous cylindrical rotatable drums; said first hopper including a receiving opening for receiving food particles, said receiving opening including a cover operably mounted thereon; the first hopper further including a dispensing aperture for dispensing food particles to said first and said second pair of contiguous cylindrical rotatable drums;

a second hopper operably positioned in said housing member and in proximity to said sheet forming drum; said second hopper including a receiving opening for receiving food articles and a dispensing opening for dispensing food articles to said sheet forming drum; said second hopper including a toothed appendage proximate to said dispensing opening for positioning and dispensing individual food articles against said sheet forming drum; and means for controlling the rotation of said first and said second pair of contiguous rotatable drums and for controlling the rotation of said sheet forming drum.

2. The apparatus for the preparation of sushi products of claim 1, wherein said means for controlling the rotation of said first and said second pair of contiguous rotatable drums and for controlling the rotation of said sheet forming drum comprises an electric motor.

3. The apparatus for the preparation of sushi products of claim 1, wherein said means for controlling the rotation of said first and said second pair of contiguous rotatable drums and for controlling the rotation of said sheet forming drum comprises a hand operated crank arm.

4. The apparatus for the preparation of sushi products of claim 1, wherein said first pair of contiguous cylindrical rotatable drums are separately rotatable and separately operable from one another.

5. The apparatus for the preparation of sushi products of claim 1, wherein said second pair of contiguous cylindrical rotatable drums are separately rotatable and separately operable from one another.

6. The apparatus for the preparation of sushi products of claim 1, wherein said wells on said surface of said first pair of contiguous cylindrical rotatable drums are of a greater depth than said wells on said surface of said second pair of contiguous cylindrical rotatable drums.

7. The apparatus for the preparation of sushi products of claim 1, wherein said second hopper further includes one or more curved walls therein.

8. The apparatus for the preparation of sushi products of claim 1, wherein said plurality of rollers are covered with a layer of rubber.

9. The apparatus for the preparation of sushi products of claim 1, wherein said first pair of contiguous cylindrical rotatable drums are rotated in an opposite direction to a rotation of said second pair of contiguous cylindrical rotatable drums.

10. The apparatus for the preparation of sushi products of claim 1, wherein said trigger means comprises a post element projecting from said housing member.

* * * * *